June 4, 1935.  G. H. HUFFERD  2,003,539
UNIVERSAL JOINT
Filed Nov. 27, 1933
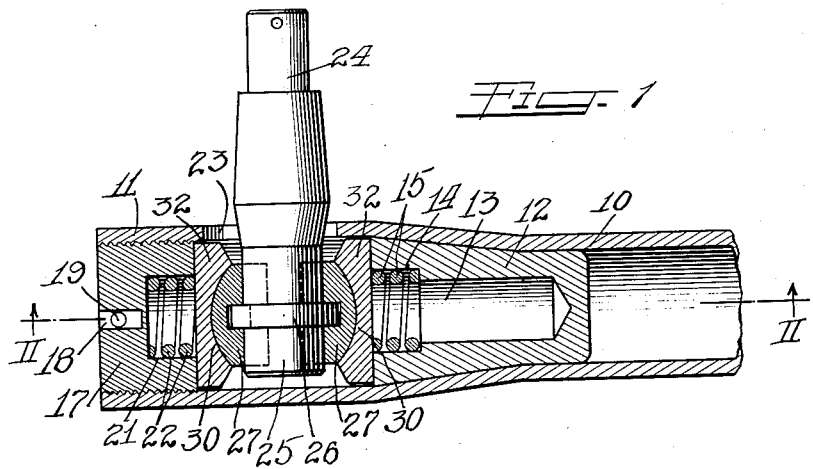
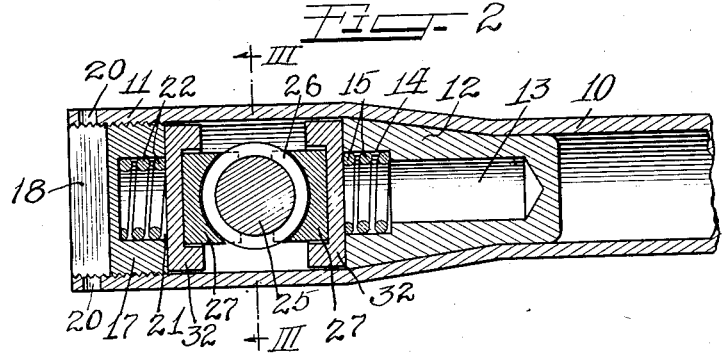
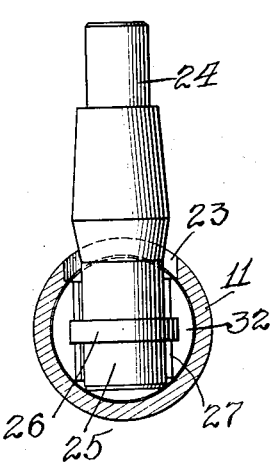
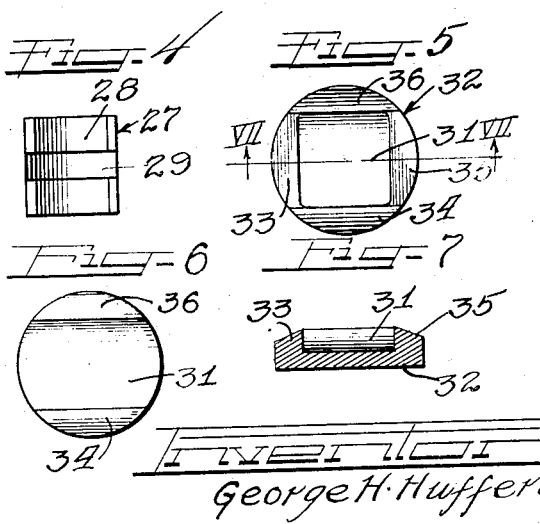
Inventor:
George H. Hufferd.

Patented June 4, 1935

2,003,539

UNITED STATES PATENT OFFICE 2,003,539

UNIVERSAL JOINT

George H. Hufferd, Detroit, Mich., assignor to Thompson Products, Incorporated, Detroit, Mich., a corporation of Ohio Application November 27, 1933, Serial No. 699,817

9 Claims. (Cl. 287—93)

This invention relates to a universal joint having cylindrical bearing surfaces cooperating to give a universal action. More specifically this invention relates to a universal joint for use in connection with connecting links, tie rods, drag links, radius rods and the like, which joint permits all the movements of a ball joint but has greatly increased bearing surfaces imparting superior wearing qualities and strength to the construction.

It is an object of this invention to provide a universal joint for use in connection with connecting links and the like which does not have spherical bearing surfaces.

Another object of this invention is to provide a mock ball joint in which all of the universal movements are obtained through cooperating cylindrical surfaces.

A further object of this invention is to provide a mock ball joint in which universal action is distributed over three separate bearing surfaces.

Another important object of this invention is to produce a universal joint having cylindrical cooperating surfaces in full contact with each other.

Another important object of this invention is to provide a universal joint for tie rod, drag link and radius rod constructions having a smaller hole for the stud member than is possible in ball joint constructions.

Other and further objects of this invention will be apparent to those skilled in the art from this specification and accompanying sheet of drawings which form a part of the specification.

The invention may be embodied in various forms and combinations and the annexed drawing merely show a preferred specific type of construction illustrating the invention. It should be understood, however, that the invention is not limited to the specific construction illustrated but is of a broad nature or scope as is evident from the claims.

On the drawing:

Figure 1 is a vertical longitudinal section, with parts in elevation, taken through the end of a connecting link.

Figure 2 is a cross sectional view taken substantially along the line II—II of Figure 1.

Figure 3 is a cross sectional view taken substantially along the line III—III of Figure 2 with parts in elevation.

Figure 4 is an elevational view of one of the cylindrical seating members.

Figure 5 is a plan view of one of the seat members adapted to receive the member shown in Figure 4.

Figure 6 is a plan view of a modified form of seat member as shown in Figure 5.

Figure 7 is a cross sectional view taken along the line VII—VII of Figure 5.

As shown on the drawing:

In Figures 1 and 2 the reference numeral 10 indicates a hollow rod such as a drag link or a tie rod having an enlarged housing portion 11. A tapered reinforcing member 12 is snugly fitted into the rod 10 through the housing portion 11 and extends into the rod 10. The member 12 is provided with a cylindrical bore 13 having an enlarged portion 14 at the outer end thereof for receiving a spring 15 for a purpose to be hereinafter described.

The housing 11 of the rod 10 has an open end for receiving a plug 17 in screw thread relation. The plug 17 is slotted at 18 for receiving a locking pin 19. The pin 19 extends through holes 20 in the housing 11. The plug 17 is provided with a well 21 for receiving a spring 22 for a purpose to be hereinafter described.

One face of the housing 11 has an opening 23 therein for allowing the passage of a stud member 24 into the interior of the housing. The stud member 24 is similar to the stud members used in ball joint constructions except that the extremity of the stud member does not terminate in a ball but has a cylindrical surface 25. The cylindrical end 25 of the stud member 24 is provided intermediate its ends with a laterally extending cylindrical collar 26 integral therewith or shrunk thereon. A pair of seating members 27 having cylindrical inside surfaces for contacting the cylindrical surface 25 of the stud member are placed around the stud member. The seating members 27 have a grooved cylindrical portion 29 for receiving the collar 26.

As shown in Figure 1 the outside surfaces 30 of the seating members 27 are cylindrical or convex with their radii in a plane normal to the plane of the radii of the inside concave surfaces 28. The seating members 27 therefore have inside cylindrical concave surfaces 28 and outside cylindrical convex surfaces 30 whose radii are in planes normal to each other.

The outside convex surfaces 30 of the seating members 27 engage with cylindrical concave surfaces 31 of circular disc members 32. The disc members 32 have flat backs, against which the springs 15 and 22 bear, as shown in Figures 1 and 2. The members 32 are therefore rotatable in the housing 11 of the rod 10 and are held in position by the springs. The tension on these end members may be adjusted by movement of the plug 17 in the end of the housing 11.

The circular members 32 may be formed either as shown in Figures 5 or 6 with a cylindrical concave surface 31 at the center thereof bounded by beveled edges 33, 34, 35, and 36 or the cylindrical portion 31 may be bound only by the edge portions 34 and 36 as shown in Figure 6. In this figure the cylindrical surface 31 extends transversely across the entire disc member and the seating members 27 are held in position by the collar 29. In the construction shown in Figure 5 however the edge portions 33 and 35 cooperate with the edge portions 34 and 36 to hold the seating members 27 in position.

From the above description it is evident that a full universal joint action is obtained by the co-operation of three separate bearing surfaces, all of which are cylindrical. Thus the stud member 24 may be rotated in the groove 29 of the seating members 28 since the collar 26 of the stud member 24 is rotatable in the groove 29. Angular movement in one plane is permitted by the relative movement between the outside bearing surfaces 30 of the seating members 27 and the surfaces 31 of the disc members 32. Angular movement in the other plane is permitted by a rotation of the disc members 32 in the housing 11. In this manner the three motions of universal joint action are distributed over three separate bearing surfaces as opposed to one surface in the conventional ball joint. This construction increases the effective bearing area of the joint and thereby increases its strength.

In commercial manufacture it is much easier to produce cylindrical bearing surfaces which have full contact with their cooperating surfaces than it is to produce cooperating spherical bearing surfaces. The usual contact area of a ball in a socket in the conventional ball joint is about twenty percent of the projected area of the ball. In my preferred construction it is possible to have full contact of the bearing surfaces at all times. Thus the projected cylindrical surface 25 of the stud member end is at all times in one hundred percent contact with the seating members 27 while at the same time the seating members 27 are in full one hundred percent contact with the circular members 36. The full contact of the bearing surfaces means longer life for the joint and less friction during operation.

My construction also permits the use of a smaller hole in the side wall of the housing through which the stud projects than is possible in the conventional ball joint construction. The small hole in the side wall yields a safer construction since the parts are almost entirely enclosed in the housing. Furthermore this construction also renders it easy to seal the joint against loss of lubricant or any ingress of foreign matter.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. A universal joint comprising, in combination, a housing, circular disc members rotatable in said housing, concave inner surfaces on said disc members, seating members having outside convex surfaces for fitting in said disc members and having inside cylindrical surfaces and a stud member having a cylindrical surface rotatable in said seating members.

2. A universal joint comprising, in combination, a stud member having a cylindrical surface, thereon, a collar projecting from said surface, a pair of seating members having cylindrical inner faces for fitting around said cylindrical stud surface and collar, a pair of disc seating members rotatable in said housing having concave surfaces for receiving said first named seating members and a housing for holding said seating members and stud in assembled relation.

3. A universal joint comprising, in combination, a cylindrical housing, a pair of circular discs rotatably mounted therein and having concave inner surfaces, a pair of seating members having convex outer surfaces for engaging the inner concave surfaces of said discs and having concave cylindrical inner surfaces, a stud member having a cylindrical end portion rotatable against and on the concave inner surfaces of the seating members and spring means for holding said discs and seating members in assembled relation.

4. A universal joint comprising a housing, a stud having a cylindrical end portion in said housing, a collar on said end portion projecting laterally therefrom, a pair of seating members having longitudinally extending cylindrical inner surfaces for fitting around said cylindrical stud end portion and collar thereon and having transverse cylindrical outer surfaces, a pair of circular disk seating members rotatable in said housing having cylindrical inside surfaces for receiving the outer surfaces of the first named seating members and means urging said seating members and stud in assembled relation in the housing.

5. A joint comprising a housing, a stud having a cylindrical end portion in said housing, a circular collar on said cylindrical end portion extending laterally intermediate the ends thereof, seating members having cylindrical inside surfaces contacting said cylindrical end portion, a groove in said seating members for receiving said collar, circular disc members rotatable in said housing having cylindrical outside surfaces in bearing relation with said seating members and means in the housing for holding the stud end, seating members and disk members in cooperative position to provide universal movement of the stud relative to the housing.

6. A joint comprising a housing, a stud extending freely from said housing having a cylindrical bearing portion in said housing, a pair of seating members disposed around the bearing portion of said stud in bearing relation therewith and having cylindrical outside surfaces normal to the axis of the stud, circular disk members rotatable in said housing having cylindrical bearing surfaces for receiving said seating members and having substantially flat back surfaces, spring means urged against the back surfaces of said circular disks and means for varying the pressure of said spring members on said disk.

7. A tie rod end comprising a tubular member having an open end and having an aperture in the side wall near the end thereof, a plug in said tubular member having a countersunk portion for receiving a coiled spring, a stud member extending freely through the opening in the wall of the tubular member and having a cylindrical bearing surface in said member, a collar projecting laterally from said cylindrical bearing surface intermediate the ends thereof, a pair of seating members disposed around said stud end in bearing relation therewith and having grooves cut therein for receiving said collar, said seating members provided with cylindrical outside surfaces curved about an axis normal to the axis of the stud, a pair of circular disks rotatable in said tube around the inner walls thereof and having bearing surfaces for receiving the outside surfaces of said seating members and having substantially flat back surfaces, a cap threaded in the end of said tubular member having a countersunk well portion therein, a coiled spring in said well portion bearing against the back surface of one of the disk members and means for locking said cap in adjusted relation to control the frictional contact of the respective cylindrical bearing surfaces in the tube.

8. A joint having a plurality of pairs of cylindrical bearing surfaces comprising a housing having a cylindrical inner bearing surface, a pair of spaced members in said housing having cylindrical peripheries in bearing relation with the housing bearing surface and having cylindrical faces therein, seating members having outside cylindrical surfaces for fitting in the cylindrical faces of said spaced members and having inside cylindrical surfaces and a stud member having a cylindrical portion rotatable in said seating members.

9. A joint comprising a housing, a stud extending freely from said housing and having a cylindrical bearing portion in said housing, a pair of seating members disposed around the bearing portion of said stud in bearing relation therewith and having cylindrical outside surfaces, circular disk members rotatable in said housing having cylindrical bearing surfaces for receiving said seating members and means for maintaining said members in operative bearing relation within the housing.

GEORGE H. HUFFERD.